United States Patent
Beroth et al.

(10) Patent No.: US 7,607,732 B2
(45) Date of Patent: Oct. 27, 2009

(54) ONE-PIECE DRESS COVER FOR AIRCRAFT SEAT

(75) Inventors: Michael Beroth, Winston-Salem, NC (US); Sean Hames, Weston, FL (US); Catalin Bunea, Fort Lauderdale, FL (US); Daniel I. Udriste, Weston, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/821,416

(22) Filed: Jun. 22, 2007

(65) Prior Publication Data

US 2008/0315643 A1    Dec. 25, 2008

(51) Int. Cl.
*A47C 31/11* (2006.01)
*A47C 1/02* (2006.01)

(52) U.S. Cl. ............... 297/229; 297/219.1; 297/224; 297/228.1; 297/228.11; 297/228.12; 297/68

(58) Field of Classification Search ............ 297/219.1, 297/224, 225, 228, 228.1, 228.11, 228.12, 297/229, 68
See application file for complete search history.

(56) References Cited

U.S. PATENT DOCUMENTS

| | | | | | |
|---|---|---|---|---|---|
| 1,836,302 | A | * | 12/1931 | Bloomfield | 297/229 |
| 1,964,242 | A | * | 6/1934 | Behrle | 297/224 X |
| 2,568,398 | A | * | 9/1951 | Johnson | 5/402 |
| 2,589,901 | A | * | 3/1952 | Van Doren | 297/218.5 X |
| 2,608,243 | A | * | 8/1952 | Kostrowski | 297/218.3 |
| 2,644,508 | A | * | 7/1953 | Weill | 297/218.4 |
| 2,807,314 | A | * | 9/1957 | Larkin | 297/229 |
| 2,809,692 | A | * | 10/1957 | Taffae | 297/218.5 X |
| 2,811,199 | A | * | 10/1957 | Morrill, Jr. | 297/229 |
| 2,817,391 | A | * | 12/1957 | Zacks | 297/229 |
| 2,822,862 | A | * | 2/1958 | Zacks | 297/229 |
| 2,900,012 | A | * | 8/1959 | McGlone | 297/228.12 |
| 3,025,104 | A | * | 3/1962 | Murphy | 297/218.3 |
| 3,066,435 | A | * | 12/1962 | Oddo et al. | 297/219.1 |
| 3,083,054 | A | * | 3/1963 | Weaver | 297/228.12 |
| 3,278,226 | A | * | 10/1966 | Magnusson | 297/228.1 |
| 3,628,830 | A | * | 12/1971 | Mitjans | 297/452.59 |
| 3,804,457 | A | * | 4/1974 | Hellman | 297/219.1 |
| 4,212,496 | A | * | 7/1980 | Kirkham, Jr. | 297/226 |
| 4,232,899 | A | * | 11/1980 | Fister, Jr. | 297/229 |
| 4,396,227 | A | * | 8/1983 | Neilson | 297/228.11 |

(Continued)

*Primary Examiner*—Rodney B White
(74) *Attorney, Agent, or Firm*—Drinker Biddle & Reath LLP (57) ABSTRACT

A one-piece upholstery cover that covers all the visible surfaces of a typical seat such as seatback cushion, seat pan cushion, seat pan extension cushion, leg rest cushion, and leg rest extension cushion. A seat covering system is also disclosed. The seat covering system includes a single elongated piece of upholstery having a first end and a second end and a loop portion intermediate the first and second ends. A first attachment portion is adjacent to the first end of the upholstery, and at least one spring mechanism attached to the second end. A first and second pivot member are attached to opposite sides of a seat back of a reclining chair. These first and second pivot members are also fixed to a seat pedestal while a connecting member having a first end attached to the first pivot member and a second end attached to the second pivot member extends through the loop portion of the elongated piece of upholstery.

6 Claims, 8 Drawing Sheets

U.S. PATENT DOCUMENTS

| | | | |
|---|---|---|---|
| 4,669,779 A * | 6/1987 | Kaganas et al. | 297/229 |
| 4,676,549 A * | 6/1987 | English | 297/224 |
| 4,693,511 A * | 9/1987 | Seltzer et al. | 297/228.1 |
| 4,772,070 A * | 9/1988 | Leto et al. | 297/228.12 |
| D307,370 S * | 4/1990 | Bailey et al. | D6/611 |
| 4,958,886 A * | 9/1990 | Barattini et al. | 297/229 |
| 4,998,311 A * | 3/1991 | Ernst | 297/228.1 X |
| 5,150,947 A * | 9/1992 | Croshaw | 297/229 |
| 5,161,854 A * | 11/1992 | Yokoto et al. | 297/182 |
| 5,234,252 A * | 8/1993 | Wallach | 297/229 |
| 5,265,933 A * | 11/1993 | Croshaw | 297/228.1 |
| 5,518,292 A * | 5/1996 | Cozzani | 297/218.5 |
| 5,664,832 A * | 9/1997 | Stevens et al. | 297/225 |
| 5,768,758 A * | 6/1998 | Deignan et al. | 297/228.11 X |
| 5,803,539 A * | 9/1998 | Dewar et al. | 297/228.12 |
| 5,836,645 A * | 11/1998 | Sakaue et al. | 297/219.1 X |
| 5,931,538 A * | 8/1999 | Cayet et al. | 297/229 X |
| 6,089,659 A * | 7/2000 | Toyota | 297/228.11 |
| 6,338,527 B1 * | 1/2002 | Toyota et al. | 297/229 |
| 6,345,866 B1 * | 2/2002 | Jackson et al. | 297/228.12 |
| 6,447,059 B1 * | 9/2002 | Jackson et al. | 297/228.12 |
| 6,648,410 B2 * | 11/2003 | Sparks | 297/228.12 |
| 6,652,026 B2 * | 11/2003 | Toyota et al. | 297/229 |
| 6,817,664 B1 * | 11/2004 | Tang et al. | 297/229 |
| 7,172,246 B1 * | 2/2007 | Itakura | 297/219.1 |
| 2002/0096919 A1 | 7/2002 | Sparks | |
| 2005/0130537 A1 | 6/2005 | Phelps | |
| 2005/0206207 A1 | 9/2005 | Kenny | |

* cited by examiner

ONE-PIECE DRESS COVER FOR AIRCRAFT SEAT

FIELD OF THE INVENTION

This invention pertains to a seat covering in general and, in particular, to a seat covering for a reclining seat that covers any gaps that may exist between various sections of the seat when reclined.

BACKGROUND OF THE INVENTION

Seat coverings are well known in the art. Historically, these covers have been made of fabric or leather and are used to enclose the frame and cushioning components of a seat while presenting as aesthetically pleasing and durable outward surface for people to sit on. Known seat coverings have been used for each major section of a chair (e.g., seat, backrest, headrest, leg rest and armrest). The covers for each of these components are traditionally made of the same material for a given chair. For example, if the seat cushion is covered with a leather seat cover, the back, arm, leg, and head rests are also covered in the same color and type of leather.

A shortcoming of the current seat covers is that they do not extend over the entire length of the seat. As a result, gaps exist between the head and back rest, backrest and seat cushion, and seat cushion and leg rest. This can result in an unsightly appearance, particularly when the seat is fully reclined, as in an aircraft sleeping suite, as food, coins, lint and other materials can fall down into the gaps between the seats. It is for this reason that a covering that covers the entire seat including the gaps between the headrest and backrest, backrest and seat cushion, and seat cushion and leg rest would be an improvement in the art. In particular, a full-length seat cover that covers the entire seat as well as the gaps between the sections yet can be quickly installed and removed for cleaning would be an important improvement in the art.

BRIEF SUMMARY OF THE INVENTION

The invention involves a one-piece dress cover that provides a neat appearance, comfort, and ease of maintainability while covering the gaps between various sections of a vehicle seat when in the reclined position. In particular, in an embodiment, the invention is used in an aircraft seat to cover the gaps between the head rest/seat back, seat back/seat pan, seat pan/seat pan extension, seat pan extension/leg rest, and leg rest/leg rest extension.

These and other advantages of the invention will be apparent from the description of the invention provided herein.

DETAILED DESCRIPTION OF THE INVENTION

The invention involves a one-piece cover upholstery (e.g., leather or fabric) 14 that covers all the visible surfaces of a typical chair 12, such as a seatback cushion 13, seat pan cushion 15, seat pan extension cushion (not shown), leg rest cushion 17, and leg rest extension cushion 19. As shown in FIGS. 1 and 2A-C, the one-piece cover 10 is comprised of a single elongated piece of upholstery 14 having a first end 16 and a second end 18, a first attachment portion 20 adjacent to the first end 16, a loop portion 22 intermediate the first end 16 and the second end 18, and at least one spring mechanism 26 attached to the second end 18. In one embodiment, the first attachment portion 20 is a flap of upholstery, however, a button snap or any other suitable attachment may be used without departing from the scope of the invention. Two such attachment portions 20, 26 or flaps may extend from the first end 16 of the upholstery. The flaps 20 may be attached to the chair 12 through the use of a hook-and-loop type fastener such as Velcro®.

Figure 1:
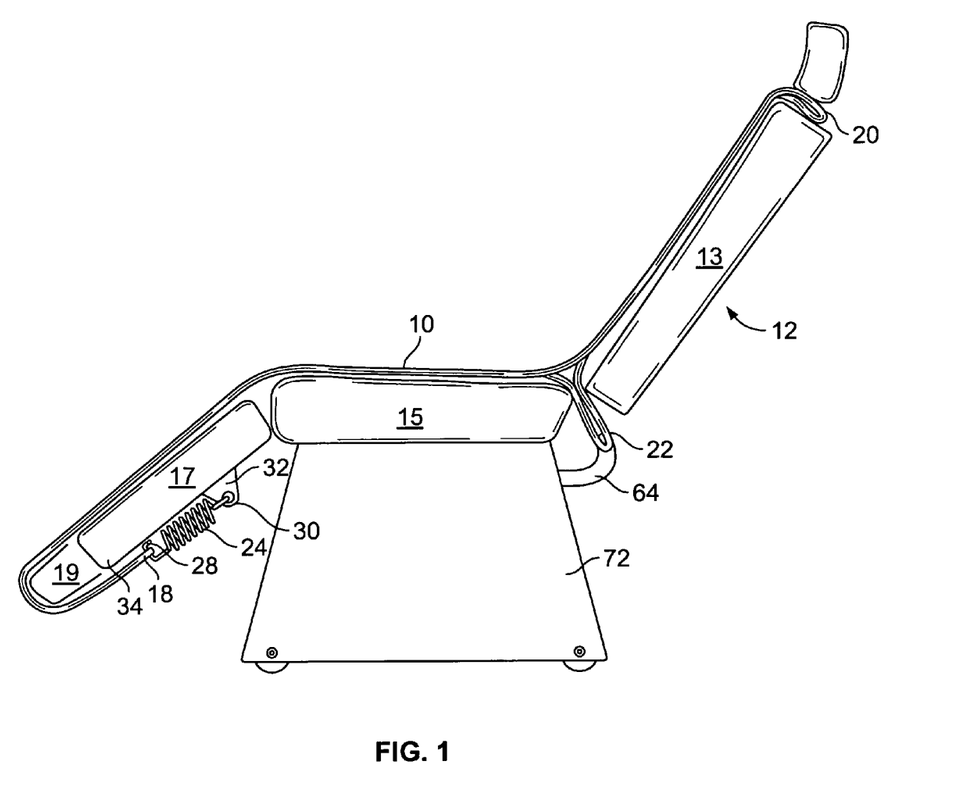
FIG. 1 is a perspective view showing the dress cover installed on a reclining chair.
Figures 2A, 2B:
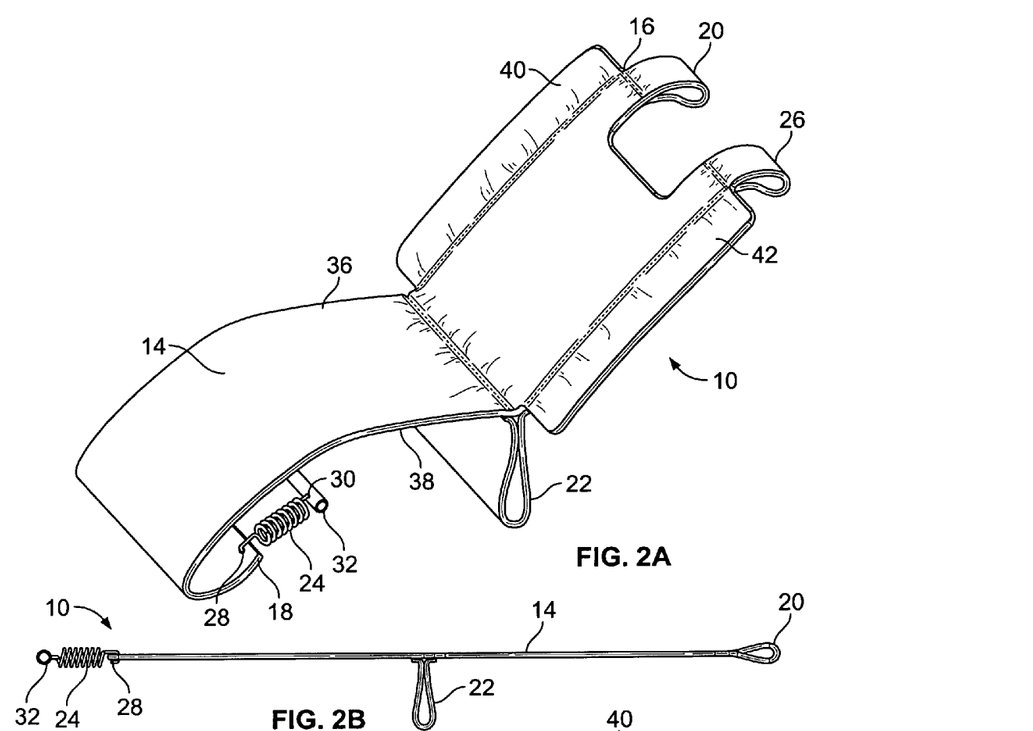
FIG. 2A is a perspective view of the one-piece dress cover.
FIG. 2B is a side view of the one-piece dress cover.
Figure 7:
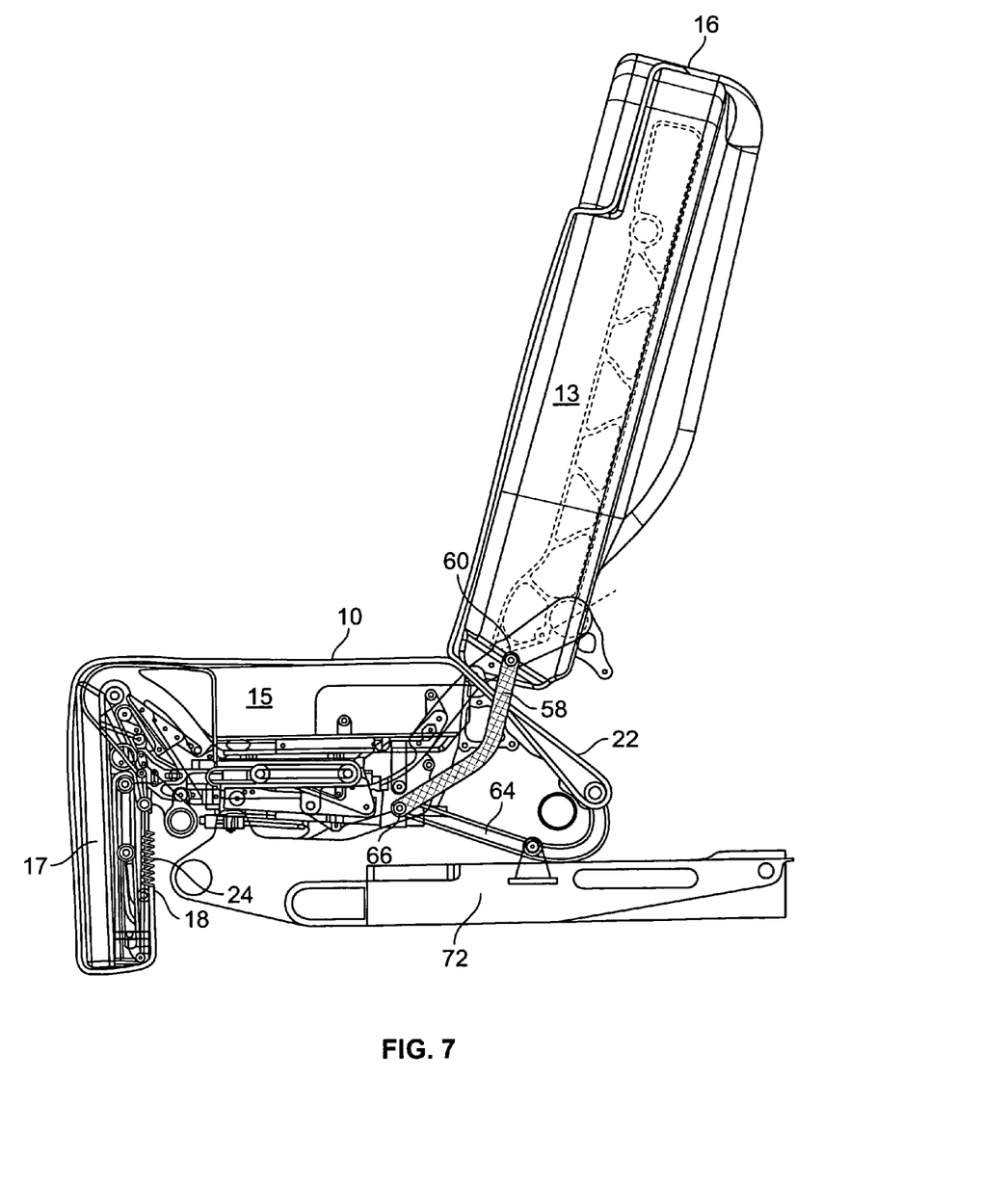
FIG. 7 is a cross section view of a portion of the chair in the TTOL position.

As shown in FIGS. 1, 2A, and 7, the spring mechanism 26 has a first end 28 and a second end 30. The first end 28 of the spring mechanism 26 is attached to the second end 18 of the upholstery, and the second end 30 of the spring mechanism 26 is attached to an underside of a leg rest portion 17 of the chair 12. The spring mechanism 26 may be a coil spring or any other suitable spring mechanism.

Figure 2C:
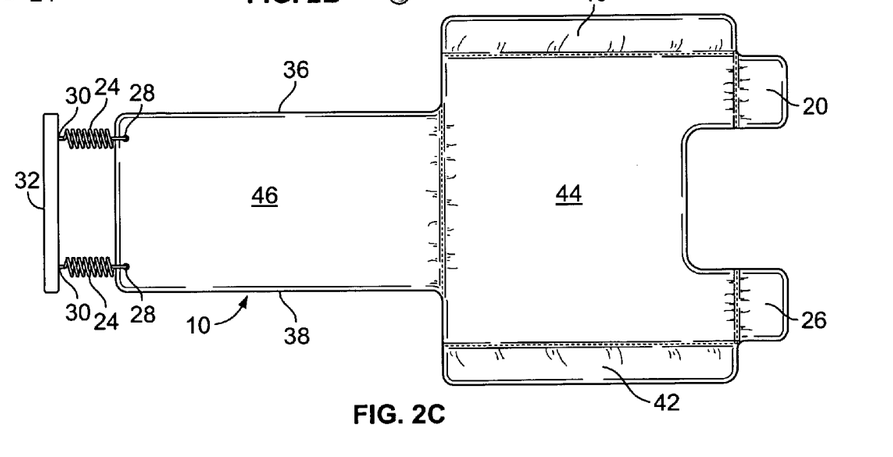
FIG. 2C is a top view of the one-piece dress cover.

As shown in FIGS. 2A-C, the single elongated piece of upholstery 14 has a first side 36 and a second side 38. These first and second sides 36, 38 are substantially perpendicular to the first and second ends 16, 18. A first side attachment portion 40 extends along approximately one-half of the length of the first side 36 of the cover proximal to the first end 16, and a second side attachment portion 42 extends along approximately one-half the length of the second side 38 of the cover proximal to the first end 16. The first and second side attachment portions 40, 42 may each be a flap of upholstery made of the same material as the other portions of the dress cover 10. In an embodiment, the first and second side attachment portions 40, 42 are secured to the chair 12 with a hook-and-loop type fastener. These attachment portions 40, 42 may also be a button snap or any other suitable attachment.

In still another embodiment, as shown in FIG. 2C, the seat cover has a first section 44 proximal to the first end 16 and a second section 46 proximal to the second end 18. The first section 44 has a first width, the second section 46 has a second width, and the first width is greater than the second width.

In an embodiment, the loop portion 22 of the seat cover 10 is made of a nylon material. The upholstery used for the seat cover 10 may be either leather, fabric, or some other suitable material without departing from the scope and spirit of the invention.

When in use, the dress cover 10 is kept tight through the spring mechanism 24 mounted rigidly under the leg rest support 17. The attachment portions 20 of the dress cover 10 (e.g., the flaps) are wrapped around the seat foam on the seat back cushion 13 and headrest with a hook-and-loop type attachment such as Velcro®. The cover 10 between the seat back 13 and seat pan 15 is pulled tight through a set of fabric attachments from a structural seat cross member 56.

Figure 3:
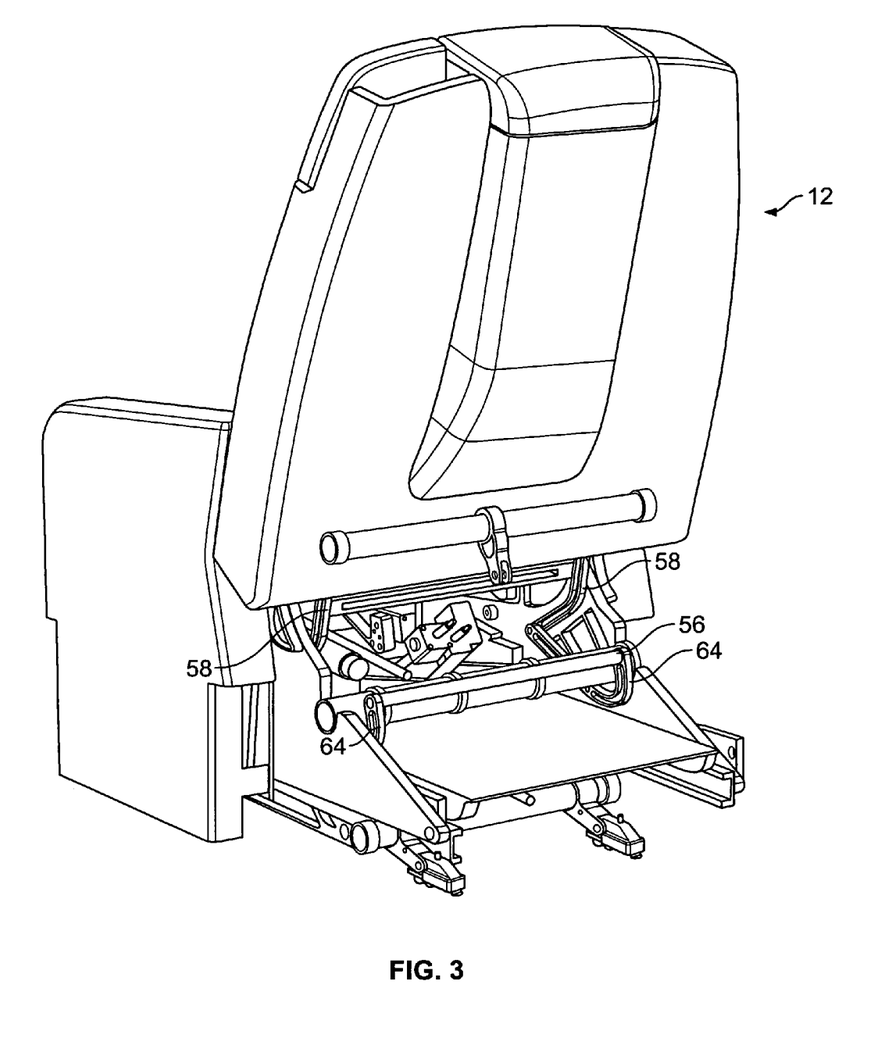
FIG. 3 is a perspective view of a reclining chair showing a view of the seat pan stretcher subassembly.
Figure 4:
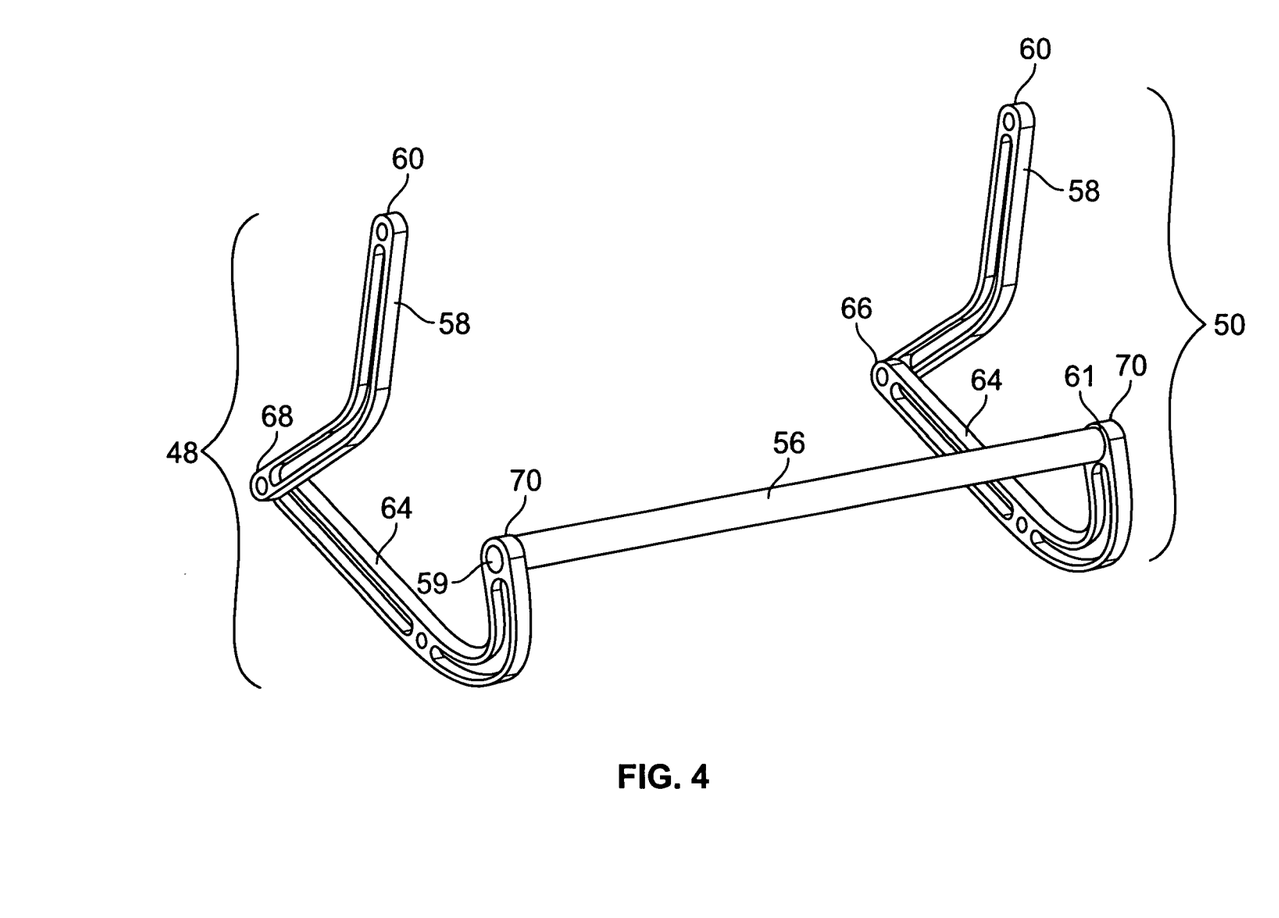
FIG. 4 is a perspective view of the seat pan stretcher subassembly.

The stretching mechanism for the one-piece dress cover 10 is comprised of two subassemblies. The first subassembly, shown in FIGS. 3 and 4, is the seat pan stretcher located between the seat back 13 and the seat pan 15. The second is the leg rest stretcher located under the leg rest 17, as shown in FIGS. 1, 2A, 2C, and 7.

As shown in FIG. 4, the seat pan stretcher subassembly is comprised of an upper link 58, a lower link 64 (one for each side of the seat) and a connecting member 56. The upper link 58 is mounted to the seat back 13 through a pivot joint and attached at the opposite end 68 to the lower link 64 with a free pivot joint. The lower link 64 is attached to the seat base frame 72 through a fixed joint and at the free end 70 has a connecting member or cross tube 56 to hold the one piece dress cover 10 nylon loop 22.

When in use, the one-piece dress cover 10 is secured over the top of the seat back 13 through the use of attachment portions e.g., flaps 20, 26 that are attached to the top of the seat back 13 through the use of a suitable fastening mechanism. The dress cover 10 is then smoothed along the length of the seat back 13 where it is also secured to side of the seat back 13 using attachment portions e.g., flaps 40, 42 having a suitable fastening mechanism. In an embodiment, the dress cover 10 may be fitted over the top and length of the seat back 13.

At the base of the seat back 13, the loop portion 22 of the dress cover 10 is extended between the bottom of the seat back cushion 13 and the back edge of the seat cushion 15. In an embodiment, the loop 22 is made of nylon, however, any suitable elastic-type material may be used without departing from the spirit and scope of the invention. Once it is extended between the seat cushion 15 and back cushion 13, the loop portion 22 is attached to the seat pan stretcher subassembly.

Once the loop portion 22 is secured to the seat pan subassembly, the remainder of the dress cover 10 is smoothed along the length of the seat pan cushion 15 and the leg rest 17. The end of the dress cover 10 is wrapped around the bottom of the leg rest 19 where it is attached to at least one spring 24 that is connected at its opposite end 30 to a fixed point on the back of the leg rest 17.

The invention also includes a seat covering system for a reclining chair 12. The seat covering system comprised of a single elongated piece of upholstery 14 having a first end 16 and a second end 18 and a loop portion 22 intermediate the first and second ends 16, 18. A first attachment portion 20 is adjacent to the first end 16 of the upholstery, and at least one spring mechanism 24 is attached to the second end 18. A first and second pivot member 48, 50 are attached to opposite sides of a seat back 13 of the reclining chair 12. These first and second pivot members 48, 50 are also fixed to a seat pedestal 72 while a connecting member 56 having a first end 59 attached to the first pivot member 48 and a second end 61 attached to the second pivot member 50 extends through the loop portion 22 of the elongated piece of upholstery 14. In an embodiment, the connecting member 56 has an elongated tubular shape.

In another embodiment, each pivot member 48, 50 is comprised of an upper link 58 having a first end 60 attached to the seat back, and a lower link 64 having a first end 66 attached to a second end 68 of the upper link 58, and a curved section terminating at a second end 70. In this embodiment, the first end 59 of the connecting member 56 is attached to the second end 70 of the lower link 64 of the first pivot member 48, and the second end 61 of the connecting member 56 is attached to the second end 70 of the lower link 64 of the second pivot member 50. The lower link 64 of each pivot member 48, 50 is also fixed to the seat pedestal 72.

Figure 5:
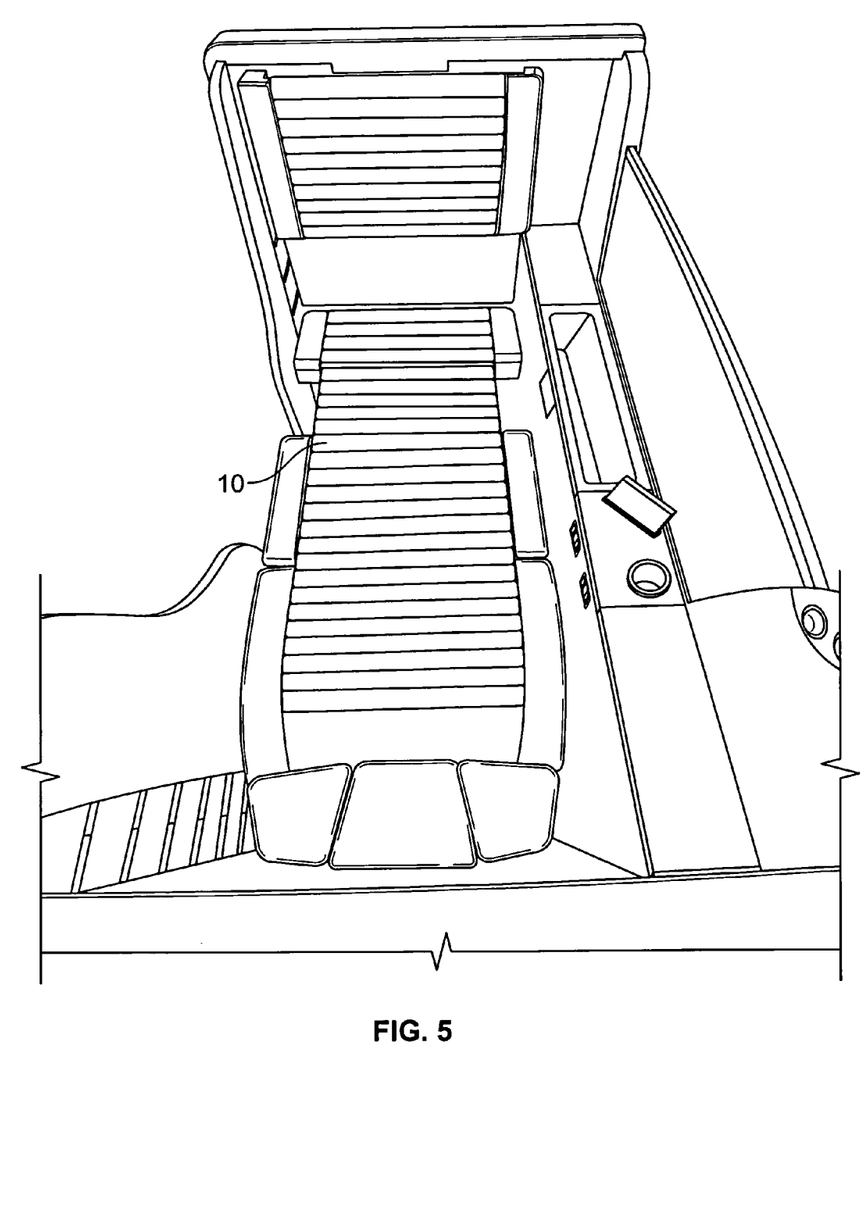
FIG. 5 is a perspective view showing a chair covered by the one-piece dress cover in a berth position.
Figure 8:
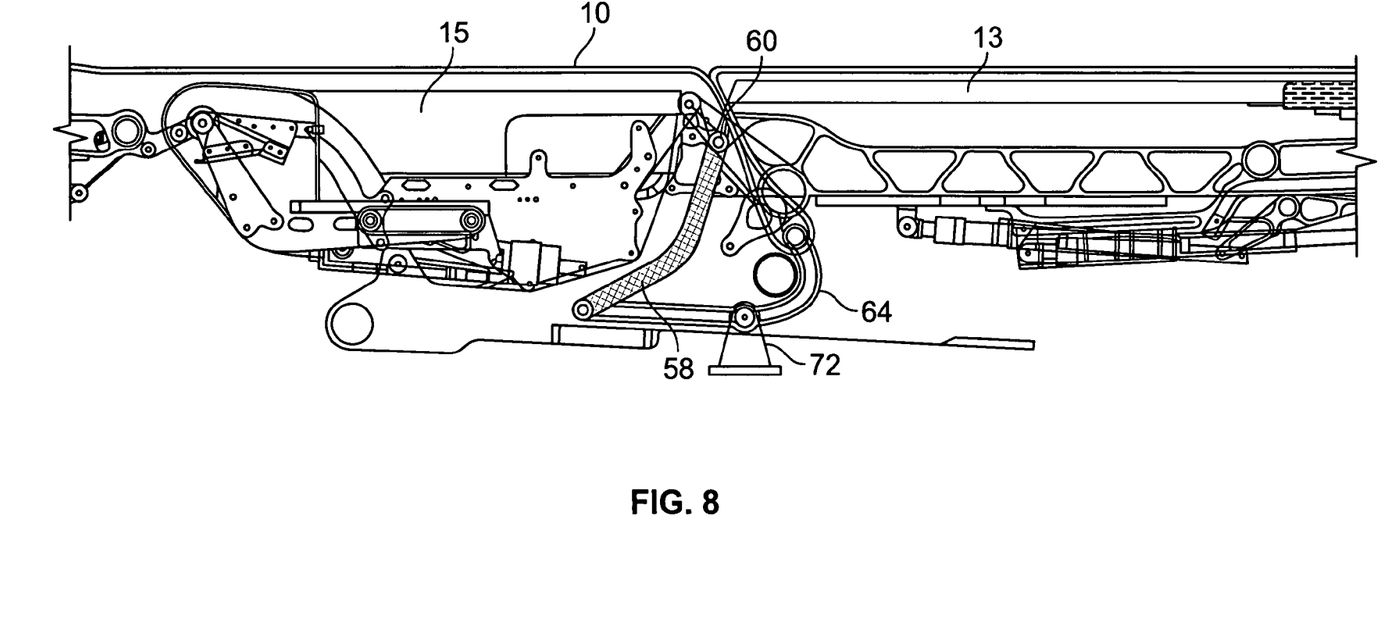
FIG. 8 is a partial cross section view of the seat and backrest portions of a chair in the berthing position.

When in operation, as a passenger reclines the seat from the taxi, take-off or landing ("TTOL") configuration to the berthing position, the seat back 13 reclines and the leg rest 17 extends until the seat is in a full flat or berth position, as shown in FIGS. 5 and 8. As the leg rest 17 extends, the dress cover 10 is stretched as the top portion 16 of the cover 10 that is affixed to the top of the seat back 13 attempts to pull the rest of the cover 10 with it as the seat back 13 reclines. At the same time that the top 16 of the dress cover 10 is pulling the cover 10 up, the bottom 18 of the cover 10 is being restrained by the at least one spring 24 connected to the bottom of the leg rest portion 17 of the seat while the loop portion 22 is being restrained by the connecting member 56. This cause the dress cover 10 to be pull taught from both ends 16, 18, thereby presenting a clean, fitted look to the seat 12, as shown in FIG. 5.

When the passenger raises the seat from the berthing to the TTOL position, the seat pan subassembly causes the loop portion 22 of the dress cover to stretch as the loop 22 attempts to follow the seat back 13 to the upright position. This stretching of the loop portion 22 causes the dress cover 10 to be pulled back into the space between the seat back cushion 13 and the seat pan cushion 15. This pulling force generated by the loop portion 22 is transmitted through the dress cover 10 to the top and bottom ends 16, 18 of the cover 10, thereby exerting tension on each end 16, 18 causing the dress cover 10 to be pulled taught against the seat 12, as shown in FIG. 6.

Figure 6:
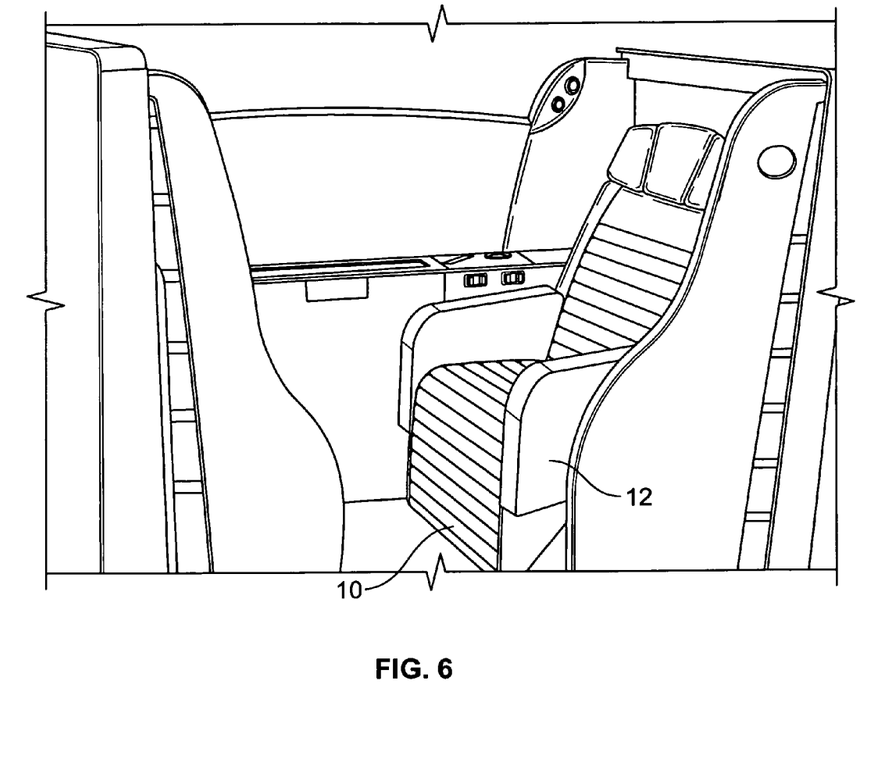
FIG. 6 is a perspective view showing a chair covered by the one-piece dress cover in a taxi, take-off, and landing ("TTOL") position.

FIGS. 6 and 7 show an aircraft passenger seat 12 in the TTOL configuration. In this configuration, the nylon loop 22 is pulled more than 1.25 inches from its location in the berth position. As shown in FIG. 2C, the leg rest stretcher subassembly is comprised of two springs 24, 25 mounted on each side underneath the leg rest 17 that pulls the one-piece dress cover 10 when the set operates between the TTOL and the berth positions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A combination seat cover and reclining chair, comprised of:
    a single elongated piece of upholstery having a first end and a second end and a loop portion intermediate the first end and the second end;
    a first attachment portion adjacent to the first end;

at least one spring mechanism attached to the second end;

a first and second pivot member attached to a seat back of the reclining chair, said first and second pivot member fixed to a seat pedestal; and a connecting member extending through the loop portion of the elongated piece of upholstery, the connecting member having a first end and a second end, wherein the first end of the connecting member is attached to the first pivot member and the second end of the connecting member is adjacent to attached to the second pivot member.

2. The combination of claim 1, wherein the connecting member has an elongated tubular shape.

3. The combination of claim 1, wherein each pivot member is comprised of:

an upper link having a first end attached to the seat back; and a lower link having a first end attached to a second end of the upper link, and a curved section terminating at a second end.

4. The combination of claim 3, wherein:

the first end of the connecting member is attached to the second end of the lower link of the first pivot member; and the second end of the connecting member is attached to the second end of the lower link of the second pivot member.

5. The combination of claim 3, wherein the lower link of each pivot member is fixed to the seat pedestal.

6. The combination of claim 1, wherein the spring mechanism is a coil spring.

* * * * *